United States Patent
Nylander

[19]

[11] Patent Number: 6,094,173
[45] Date of Patent: Jul. 25, 2000

[54] METHOD AND APPARATUS FOR DETECTING AN RFID TAG SIGNAL

[75] Inventor: Frederick Arnold Nylander, Morgan Hill, Calif.

[73] Assignee: Motorola, Inc., Schaumburg, Ill.

[21] Appl. No.: 08/844,123

[22] Filed: Apr. 18, 1997

[51] Int. Cl.[7] .................................................. H01Q 11/12
[52] U.S. Cl. ......................... 343/742; 343/867; 343/866; 343/741; 340/572
[58] Field of Search .................................... 343/742, 741, 343/867, 866, 853; 340/572; H01Q 11/12, 7/04

[56] References Cited

U.S. PATENT DOCUMENTS

| | | | |
|---|---|---|---|
| 5,126,749 | 6/1992 | Kaltner | 343/742 |
| 5,142,292 | 8/1992 | Chang | 343/742 |

Primary Examiner—Robert H. Kim
Assistant Examiner—Layla G. Lauchman
Attorney, Agent, or Firm—Terri S. Hughes

[57] ABSTRACT

An antenna array for detecting a coded radio frequency identification (RFID) tag signal generated by a tag during passage of the tag through a detection volume, or portal. The array comprises at least first and second antennas disposed at different positions around the periphery of the detection volume, and circuitry, having inputs connected to receive the respective output signals from the first and second antennas and an output connected to a signal receiver for decoding the detected signal. The circuitry provides an output signal including the respective output signals of the first and second antennas, and the sum of the output signals of the first and second antennas. Preferably, the output signal of the circuitry additionally includes the inverse of the output signal of the second antenna, and the sum of the output signal of the first antenna and the inverse of the output signal of the second antenna.

22 Claims, 6 Drawing Sheets

6,094,173

METHOD AND APPARATUS FOR DETECTING AN RFID TAG SIGNAL

FIELD OF THE INVENTION

The present invention relates to an antenna array for detecting a radio frequency identification (RFID) signal and for supplying same to a reader. More particularly, the present invention relates to an antenna array for detecting the output signal of an RFID tag passing through a detection volume, e.g., a portal or gateway, and for supplying the signal to a receiver for demodulation and decoding of the detected signal.

BACKGROUND OF THE INVENTION

The use of RFID tags or cards to identify a person or an object is well known. In general, such tags, when excited, produce a magnetic field, or in some cases an electric field, of a first frequency which is modulated with an identifying code. The tag may be either an active tag, i.e., a tag which has a self contained power supply or, as is more usually the case, may be a passive tag that requires external excitation when it is to be read or disposed within the detection volume of a reader, for example, a door way or portal. In general, for portal type devices, passive type devices are utilized wherein a transmitting antenna for transmitting an exciting frequency signal for the tag is positioned at the portal and generally adjacent an antenna for receiving the modulated magnetic field, or electromagnetic field, produced by the excited tag in order to identify the tag, and consequently the user or object attached thereto.

A problem occurs in the detection of RFID tags in large areas or volumes wherein the horizontal and vertical dimensions of the detection volume in which the RFID tag is to be read exceeds the read range or detection geometries of a single reader. Moreover, detection problems occur if the tag to be read is not restricted to a specific orientation as it passes through the portal (detection volume), for example, if the tag is carried by a person passing through the portal or is attached to a randomly oriented object, such as a parcel or a package disposed on a conveyor. In particular, the detection volume of a single reader may not span the required volume with sufficient field strength to allow the tag to be read in the corners of the volume that are located at a distance from the surface of the reader.

In order to attempt to solve this problem, it is known to use a single reader with a single planar loop antenna located around the periphery of the portal area at a forward or rear edge of the portal. However, the detection volume of a single radio frequency reader, particularly of the proximity type for detecting a magnetic field, does not span the required portal volume with sufficient field strength to allow reading of the tag at all positions. Moreover, the loop geometry may create an area wherein under certain orientations of the tag, for example, parallel or perpendicular to the floor, the field strength of the single reader may be insufficient to fully power the tag (in the case of a passive tag) thus tending to produce a weakened identification signal. Consequently, the problem exists with this arrangement of providing sufficient field strength from the tag to permit detection within the detection range of the single reader.

To attempt to overcome this problem, it is also known to use multiple reader assemblies placed in an array with each other about the portal or detection volume, with the analog signals detected by the respective readers being tied together at a single RF detection and decoding device. It is known to provide these readers either in the same plane or facing each other across the portal in order to improve the field strength at the tag in the area of detection. However, the problem still arises with regard to the detection of the RFID signal, particularly when two detected signals are 180° out of phase as can result either due to a connection of the antennas out of phase or due to the orientation of the tag relative to the planes of the antennas. For example, if a pair of antennas are disposed on opposite sides of the portal, a tag having its surface oriented parallel to the two receiving antenna coils would produce out of phase signals in the individual antenna coils while a tag having its surface oriented perpendicular to the two antenna coils would produce in phase signals in the individual antenna coils.

Accordingly, there is a need for an improved antenna array that detects a radio frequency identification (RFID) tag signal generated by a tag during passage of the tag through a detection volume. Further, such an antenna array that provided improved signal detection for use by a single receiver would be an improvement over the prior art.

DETAILED DESCRIPTION OF A PREFERRED EMBODIMENT

Figure 1:
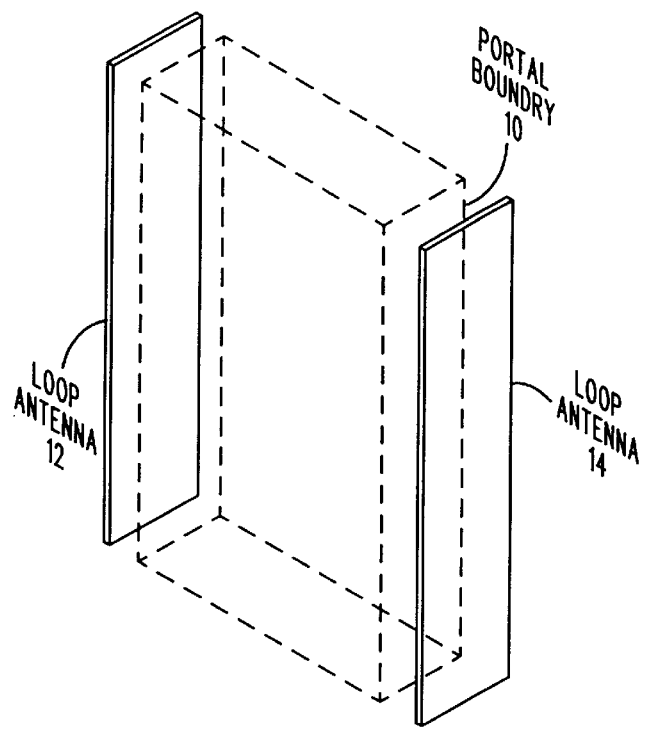
FIG. 1 illustrates a schematic drawing showing a detection volume in the form of a portal provided with first and second antennas in an array, according to the present invention.

The present invention encompasses an antenna array for detecting a radio frequency identification tag signal generated by the tag during passage of the tag through a detection volume. The antenna array includes first and second antennas, disposed at different positions around the periphery of a detection volume, a circuit having inputs connected to receive respective output signals from the first and second antennas and an output connected to a signal receiver for decoding the detected signal. The output signal carries respective output signals of the first and second antennas as well as the sum of the output signals of the first and second antennas. Preferably, the output signal of the circuit additionally includes the inverse of the output signal of the second antenna, as well as the sum of the output signal of the first antenna and the inverse of the output signal of the second antenna. In this manner, the antenna array has the effect of maximizing the signal available at the input of the single receiver by avoiding the potential negative effect of a tag signal being received 180° out of phase relative to one another by the two antennas when each antenna is individually connected, causing a vector sum that decreases the signal level at the receiver input.

According to various embodiments of the invention, the circuit may comprise a time division multiplexer having respective inputs connected to the first and second antennas, and an output connected to the signal receiver and, a control circuit for providing control signals for the multiplexer to cause the multiplexer to cyclically provide the desired output signals. Alternatively, when coil antennas are used, the circuit may include a switching arrangement connected to the first and second antenna coils, for selectively connecting the first antenna coil, the second antenna coil, or the first and second antenna coils connected in series-aiding, so that respective detected magnetic fields add, to the output of the circuit. In this latter embodiment, the switching arrangement preferably additionally selectively connects the first and second antenna coils connected in series-opposing, so that respective detected magnetic fields subtract, to the output of the circuit.

According to still a further embodiment, the circuit may include a respective analog-to-digital (A/D) converter connected to each of the antennas and a digital signal processor (DSP), responsive to the respective output signals of the A/D converters, for cyclically providing a digital output signal that includes the respective output signals of the first and second antennas and the sum of the output signals of the first and second antennas to the signal receiver. In this embodiment as well, the output of the DSP preferably additionally includes the inverse of the output signal of the second antenna and the sum of the output signal of the first antenna and the inverse of the output signal of the second antenna.

The number of antennas of the array that are disposed around the periphery of the detection volume may be more than two, in which case the circuit receives respective output signals from each of the antennas and provides an output signal including the respective output signals of each of the antennas and signals corresponding to the respective sums of the output signal of each of the antennas and the output signal of each other antenna. Moreover, in this case, preferably the output signal of the circuit additionally includes the inverse of the output signal of at least each antenna other than the first antenna, and also to the respective sums of the output signal of each antenna and the inverse of the output signal of each other respective antenna.

Turning now to FIG. 1, there is shown a detection volume in the form of a portal 10 having a pair of antennas 12 and 14 disposed around the periphery of the portal 10. In the illustrated configuration, the antennas 12 and 14 are planar or flat wound loop antennas that are disposed on opposite sides of the portal 10, so that the loop antennas 12 and 14 are parallel to one another and perpendicular to the cross-sectional plane of the portal 10. It is to be understood that although the portal 10 has been indicated as being generally rectangular in cross section, the portal 10 may be of any desired cross section shape (e.g., circular, oval, elliptical, triangular, etc.). Moreover, the coils may be of other types, e.g., solenoids, and the antenna need not have the geometrical relationship of the antennas 12 and 14, i.e., they need not be opposite or parallel to one another or perpendicular to the cross-section plane of the portal 10. For example, one of the antennas 12 and 14 could be on the bottom horizontal surface of the portal to thus effectively define a volume with a triangular cross section.

Figure 2:
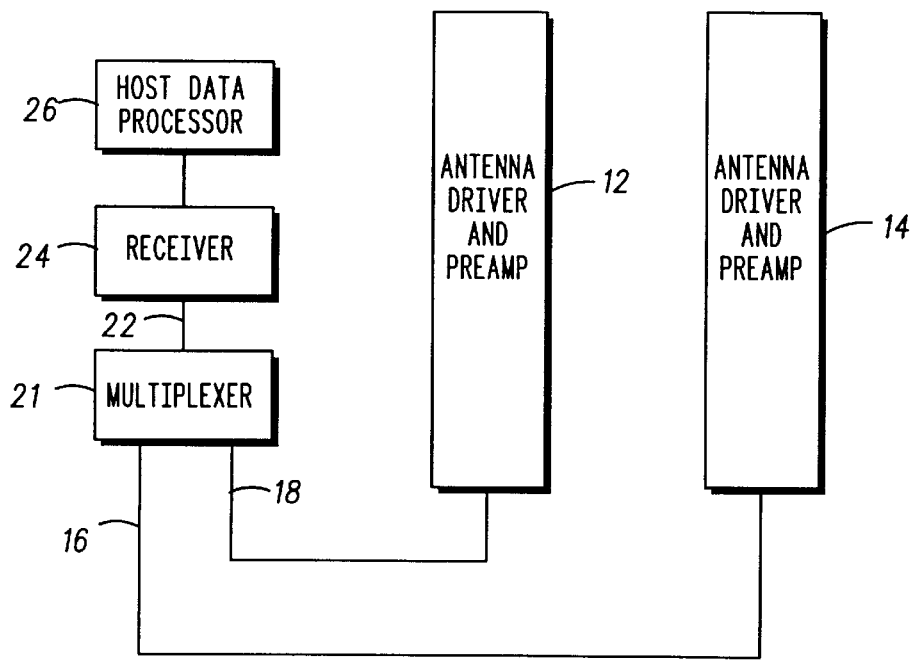
FIG. 2 illustrates a basic block circuit diagram showing the overall reader system with a time division multiplexed antenna array, according to one embodiment of the invention.
Figure 6:
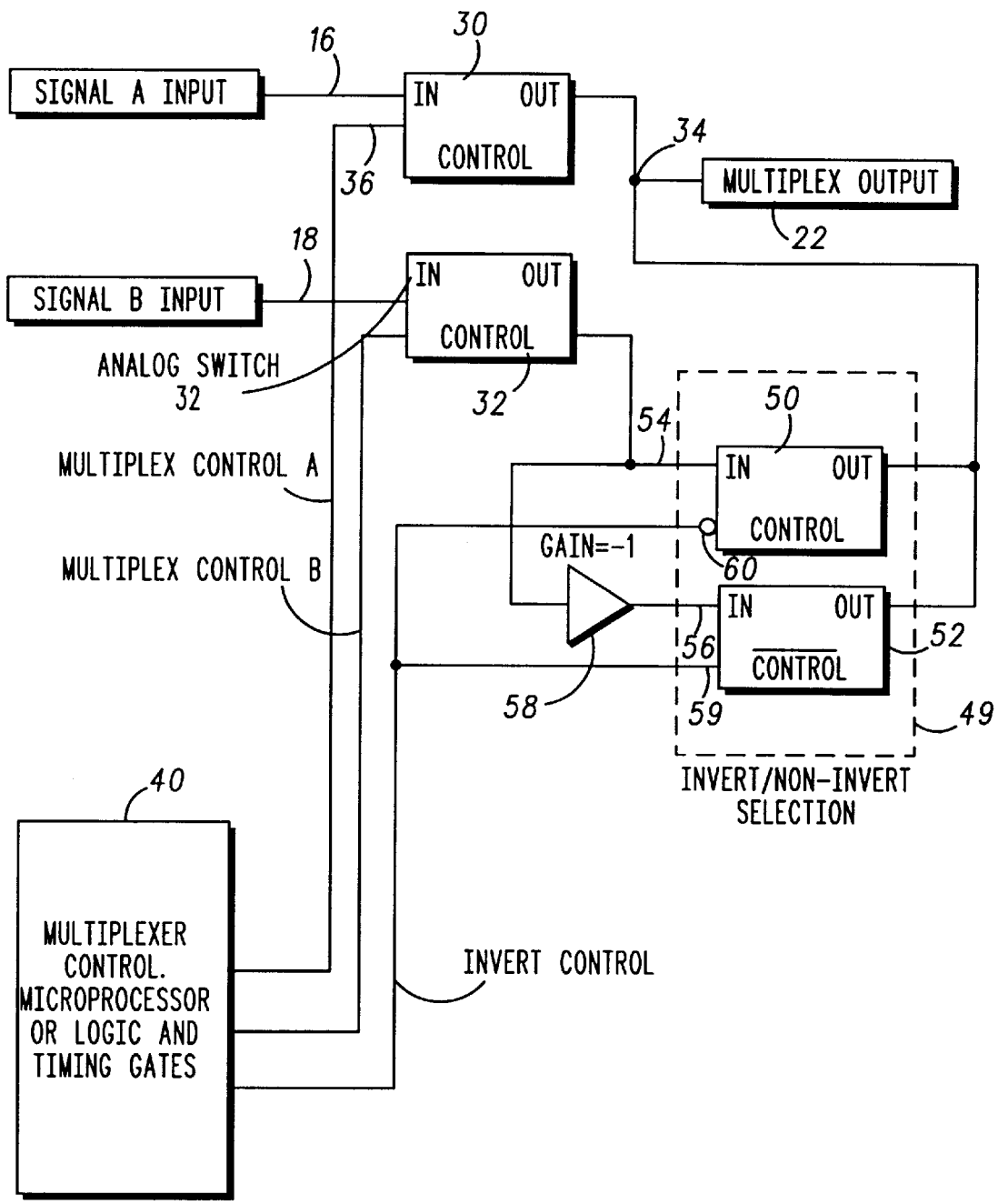
FIG. 6 illustrates a block circuit diagram for a preferred embodiment of the time division multiplexer shown in FIG. 2.

As shown in FIG. 2, the outputs of the two loop antennas 12 and 14, positioned as shown in FIG. 1, are fed to the two signal inputs 16 and 18 of a multiplexer 20 whose output 22 is connected to the input of a receiver 24 for detecting and demodulating the output signal of the multiplexer 21, and the output signal of the receiver 24 is then fed to a host data processor 26 for further usage. Two embodiments of the circuit arrangement for the time division multiplexer 20 are shown in FIGS. 3 and 6.

Figure 3:
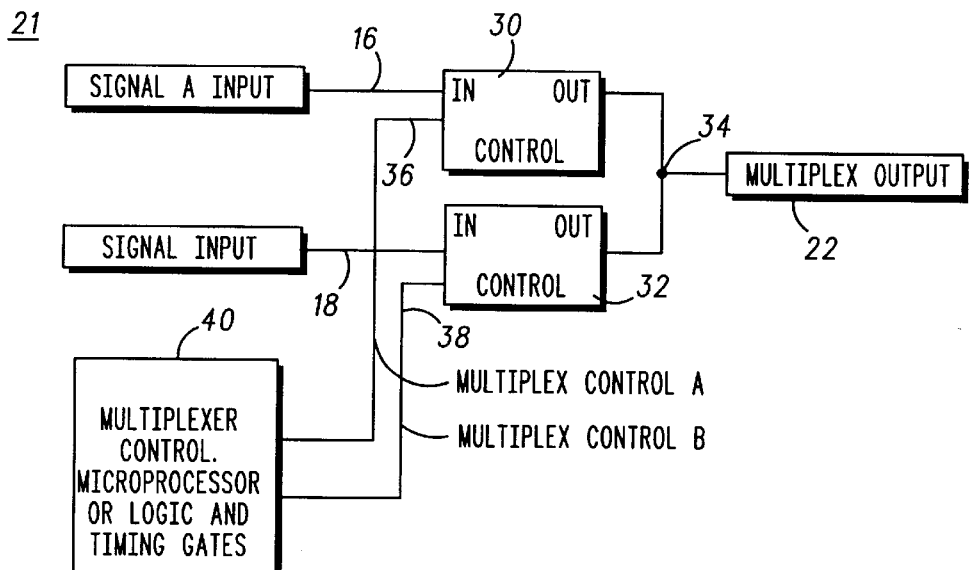
FIG. 3 illustrates a basic block circuit diagram for the multiplexer for the antenna array shown in FIG. 2.
Figure 4:
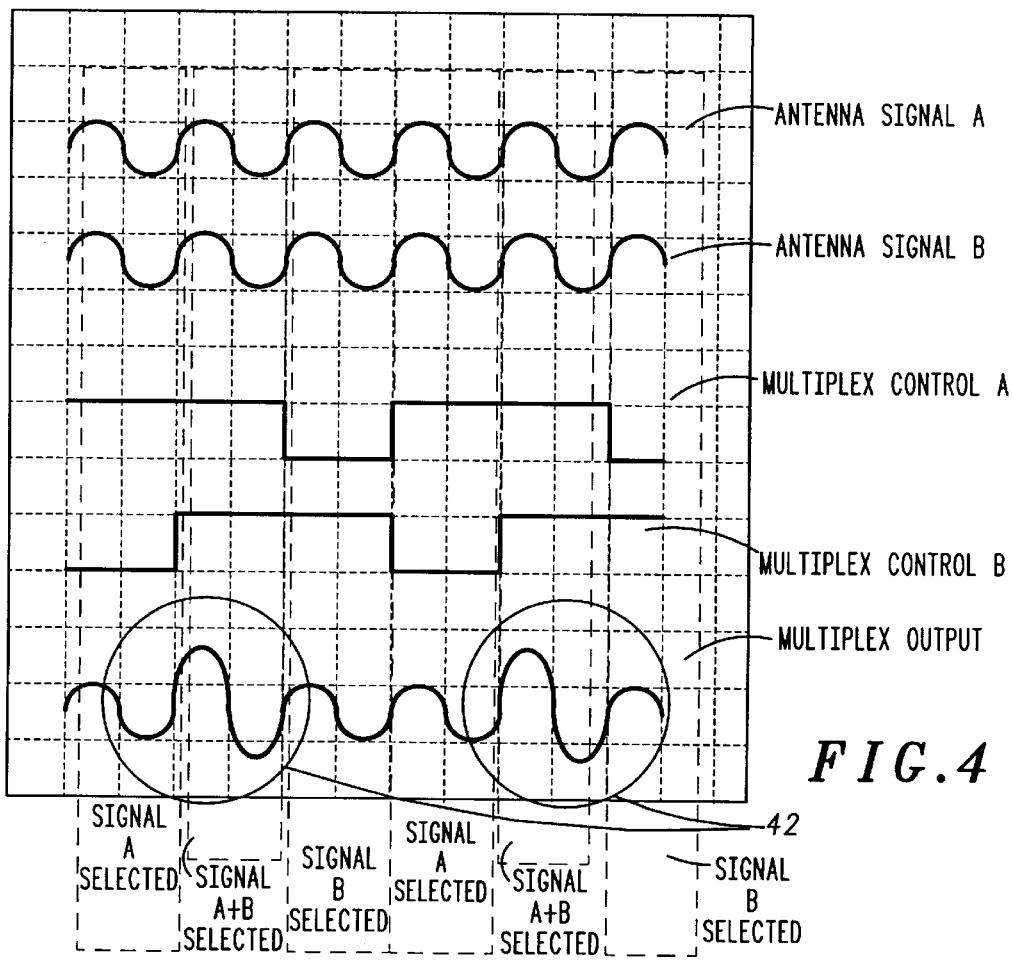
FIG. 4 illustrates a timing diagram showing the antenna signals, the multiplexer control signals, and the multiplexer output signal for the circuit of FIG. 3 when the two antenna signals are in phase.
Figure 5:
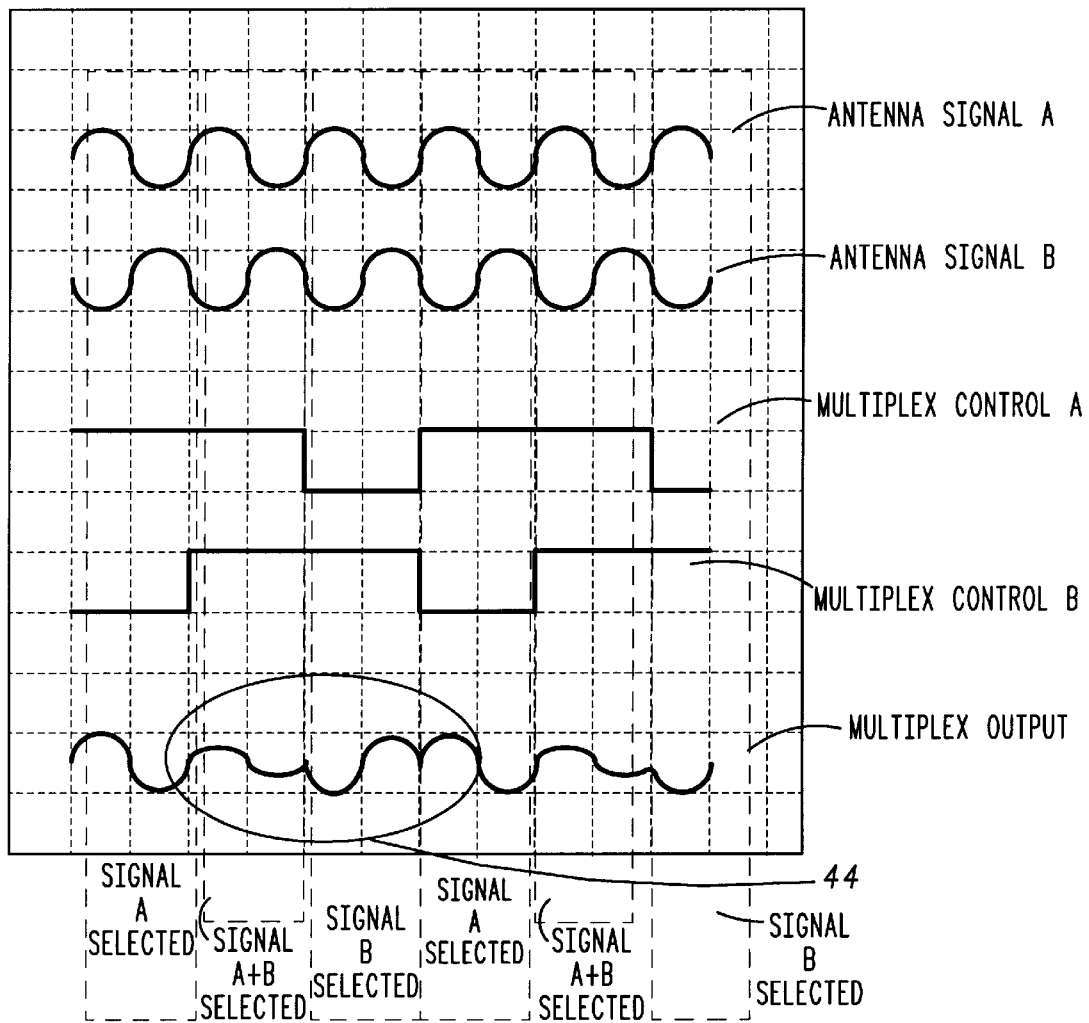
FIG. 5 illustrates a timing diagram showing the same signals as in FIG. 4 for the embodiment of the invention as shown in FIG. 3 when the two antenna signals are out of phase.

As shown in the basic multiplexer embodiment of FIG. 3, the two signal inputs 16 and 18 for the time division multiplexer 20 lead to the respective inputs of two analog switches 30 and 32, respectively. The respective outputs of the two analog switches 30 and 32 are connected to a common summing junction 34, which leads to the multiplexer output 22. Each of the analog switches 30 and 32 additionally has a respective control input 36, 38 that receives a multiplex control A signal or a multiplex control B signal from a multiplexer control circuit 40, which may be either a microprocessor or logic and timing gates, as indicated. By means of the control signals 36, 38 from the controller 40, either of the analog switches 30 and 32 can be separately or simultaneously enabled (i.e., closed) so that either the input signal A at input 16 from antenna 12, the input signal B at input 18 from antenna 14, or the sum of input signals A and B from both antennas 12 and 14 can be separately provided at the multiplexer output 22. In a preferred embodiment, the multiplex control signals are such that the signal provided at multiplexer output 22 is a cyclical sequential arrangement of the input signal A, the sum of the input signals A and B, and then the input signal B. Timing diagrams illustrating the operation of the circuit of FIG. 3, wherein the two signals received by the antennas 12 and 14 are in phase and 180° out of phase, are shown in FIGS. 4 and 5, respectively. As shown, the frequency and relative timings are greatly simplified with regard to actual signals, but fully illustrate the manner of operation of the embodiment of the time division multiplexer circuit 21 shown in FIG. 3. In these timing diagrams, a high value for the multiplex control A signal connects the signal A at input 16 from antenna 12 to the output 22 of the multiplexer while a high value for the multiplex control B signal connects the signal B from the antenna 14 at input 18 to the output 22 of the multiplexer.

As can be seen from FIG. 4, the multiplex control signals 36, 38 cause the cyclical sequence of signals at multiplexer output 22 to be comprised of signal A, signal A+B, and then signal B. With the individual input signals A and B to the multiplexer 21 being in phase, as indicated in the first two lines of the timing diagram of FIG. 4, the largest or maximum signal is produced at the output 22 of the multiplexer 20 when the signals A and B are summed, as indicated by the circles 42 and, as further shown, this signal corresponding to the sum is greater than any of the individual signals A or B. Thus, a maximization and substantial improvement in the detectability of the signals is provided.

On the other hand, as shown in FIG. 5, when the two individual input signals A and B are 180° out of phase, then the largest signal that appears at the output 22 of the multiplexer is that corresponding to the individual signals A and B as indicated by the circled portion 44. The sum signal has a reduced amplitude, as shown. Consequently, with this embodiment of the invention, one would evaluate the sum signal at the output of the multiplexer when the signals are in phase, providing an increased amplitude, but would not receive the benefits of any increased signal when the two input signals were out of phase. Thus, while the circuit arrangement can maximize the signal when the two input signals are in phase, it produces little if any substantial benefit if these signals are out of phase. Such out of phase signals can result from the antennas being somehow connected out of phase (which condition can easily be checked and then corrected, if desired), or from the orientation of a tag within the portal, a condition that cannot normally be corrected. Thus, under these conditions, the circuit of FIG. 3 does not provide an optimum solution for maximizing the multiplexer output signal.

To overcome the above mentioned problem, the multiplexer 21 preferably includes a circuit as shown in FIG. 6, wherein the same parts bear the same reference numerals and operate generally in the same manner as the corresponding parts in the circuit of FIG. 3. As shown in FIG. 6, instead of connecting the output of the analog switch 32 directly to the summing junction 34, the output of switch 32 is connected to the summing junction 34 via a circuit arrangement that permits either the signal B from the antenna 14 or the inverse of signal B to be selectively fed to the summing junction 34. For this purpose, two additional analog switches 50 and 52 are provided, the signal input 54 of switch 50 being directly connected to the output of switch 32, and the signal input 56 of switch 52 being connected to the output of switch 32 via a signal inverter 58, e.g., an amplifier that has a gain of −1. The respective outputs of the additional switches 50, 52 are connected in common to the summing junction 34. To control the state of the switches 50 and 52, the multiplexer control circuit 40 provides an additional control signal, i.e., an invert control signal, which is directly connected to a control input 59 of the switch 52 and is connected to the control input of the switch 50 via a signal inverter 60. The timing diagram for this embodiment is shown in FIG. 7 for the situation when the respective input signals A and B from the antennas 12 and 14 are 180° out of phase.

Figure 7:
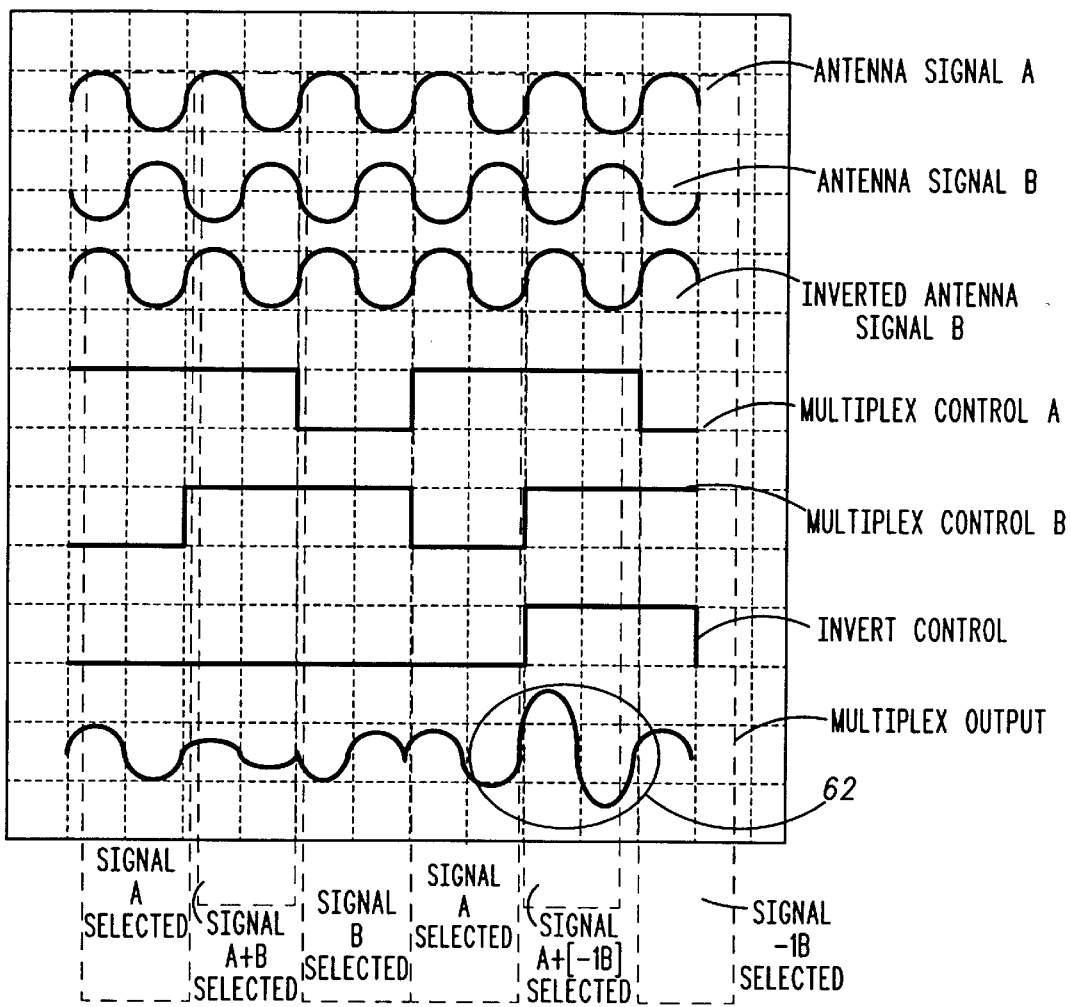
FIG. 7 illustrates a timing diagram showing the antenna signals, the multiplexer control signals including an additional invert control signal, and the multiplexer output signal for the circuit of FIG. 6 when the two antenna signals are out of phase.

As shown in FIG. 7, the multiplexer invert control signal applied to the control input 59 of switch 52 closes the switch when it is high to cause the inverse of signal B to be fed to the output 22 of the multiplexer. As can be seen from FIG. 7, the invert control signal is preferably timed so that the output signal from the multiplexer cyclically generates the sequence: signal A, the sum of signals A and B, signal B, signal A, the sum of signal A and the inverse of signal B, and finally the inverse of signal B. As further shown in FIG. 7, while a minimum output signal occurs when signals A and B are summed (45), the largest multiplexer output signal occurs when the signal A and the inverse of signal B are summed (62), with this signal being larger than that of any of the individual signals A or B from the respective antennas 12 and 14. Accordingly, since the out of phase condition may randomly occur as a result of a possible orientation of a tag within the portal area, the circuit of FIG. 6 (i.e., having the inversion control) is the preferred multiplexer embodiment to provide a maximized detection signal.

It should be noted that although the prescribed sequence of the individual antenna and sum signals is preferred and results due to a simplified switching sequence for the control signals, this sequence is not required according to the present invention, so long as the respective individual antenna and sum signals are cyclically provided.

Figure 8:
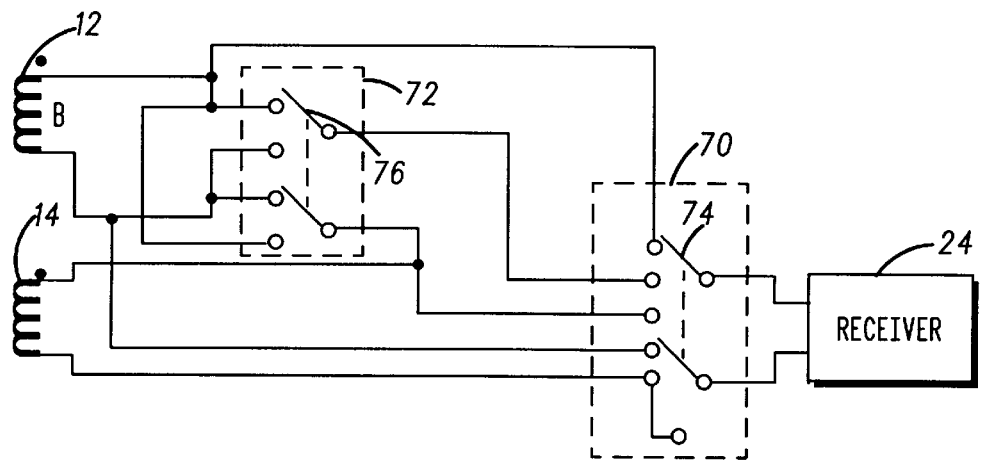
FIG. 8 illustrates a schematic circuit diagram showing another embodiment of an antenna array, according to the invention, utilizing a switching circuit rather than a multiplexer.

Turning now to FIG. 8, there is shown a further embodiment of an antenna array according to the invention for providing the same output signals as can be provided with the multiplexer embodiment of FIG. 6. According to this embodiment, instead of using the multiplexer 21, the two antenna coils 12 and 14 are connected to the receiver 24 via a pair of two-pole switches 70, 72. It is to be understood that although the switches 70, 72 are shown as mechanical switches, they may likewise be electrical switching devices realized using electronic components.

Depending on the particular positions of the switches 70 and 72, the input signal delivered to the receiver 24 (using a similar naming convention to that used to describe FIG. 6—i.e., antenna 12 produces an individual output signal A; antenna 14 produces an individual output signal B) is one of: output signal A, output signal B, the sum of output signals (A+B), or the sum of output signal A and the inverse of the output signal B, i.e., the differential signal (A−B). This is achieved by connecting the coils 12 and 14 with the indicated polarities to the switches 70 and 72 so that, as indicated, in the first illustrated position of the movable switch contacts 74 of switch 70, i.e., the upper position, the coil 12 is connected to the receiver 24 to provide the output signal A. Similarly, in the lower position of contact 74 of switch 70, the antenna coil 14 is connected to the input of the receiver 24 to provide the signal B. Lastly, in the center position of switch 70, the coils 12 and 14 are connected to the receiver 24 via the switch 72 to provide either the signal A+B or the signal A−B to the receiver 24, as next described.

Referring now to switch 72 assuming the center position for switch contacts 74, with switch contacts 76 being in the illustrated upper position, the coils 12 and 14 are connected in series-aiding fashion, so as to provide the sum of the signals A+B at the receiver. On the other hand, in the lower position of the contacts 76 of the switch 72, the coils 12 and 14 are connected in series-opposing, to provide a difference signal (A−B) to the receiver, i.e., in effect the sum of the output signal of one of the coils and the inverse of the output signal of the other coil.

Figure 9:
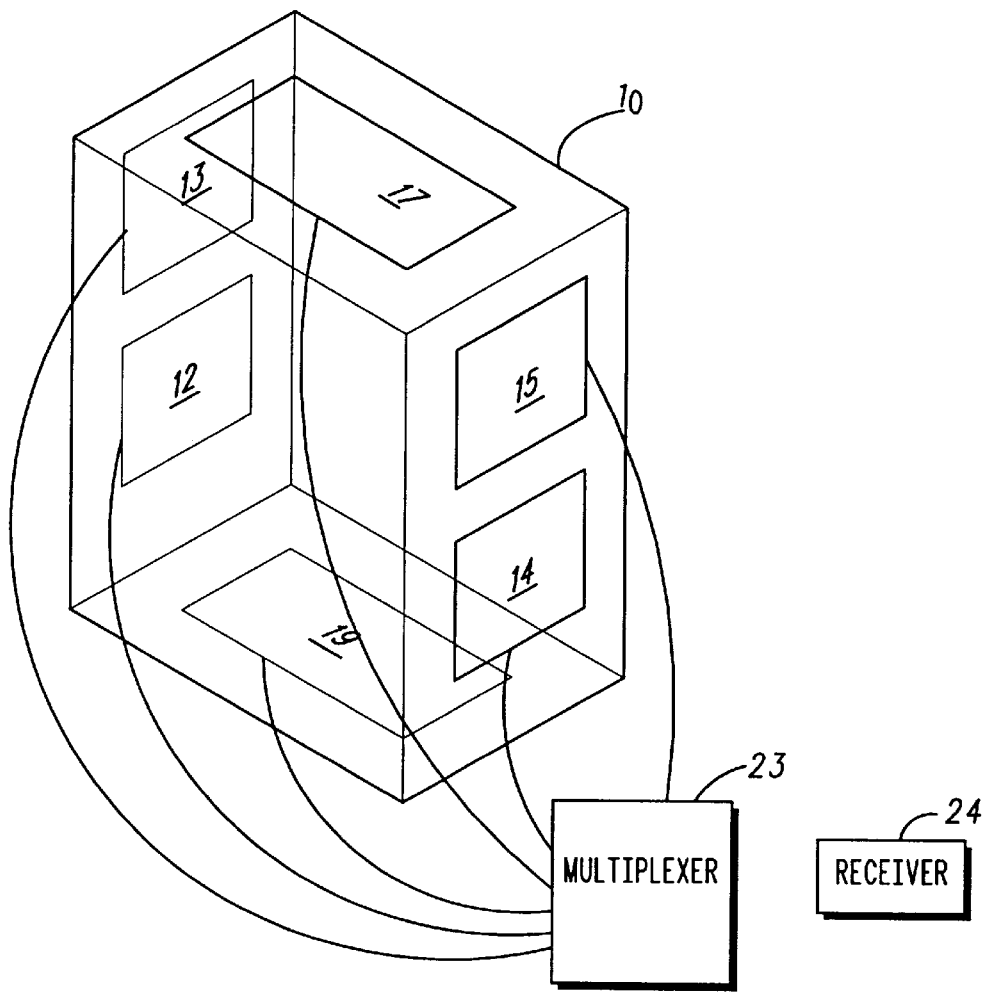
FIG. 9 illustrates a schematic drawing showing a portal having more than two antennas disposed in an array, according to the invention, around the periphery of the portal.

It should be understood that the antenna array, according to the present invention, may include more than two antennas disposed about the periphery of the detection volume or portal 10. As shown, for example, in FIG. 9, the portal 10 may be provided with six antennas having, e.g., flat or other shaped coils, distributed about the periphery of the portal 10. In particular, additional antennas 13, 15 may be disposed on the same vertical side of the portal 10 as the antennas 12, 14, respectively, and a further antenna 17, 19 may be optionally disposed on each of the top and bottom sides, respectively, of the portal 10. The outputs of each of the antennas 12–15, 17 and 19 are connected to a respective input of the multiplexer 23, which in this case is a 6:1 multiplexer rather than a 2:1 multiplexer as in the previous embodiments. In the multiplexer 23, the control signals cause an output signal that is fed as an input signal to the receiver 24 to include the respective output signals of each of the antennas, 12–15, 17 and 19, as well as signals corresponding to the sum of the respective output signals of each of the antennas and the respective output signal of each of the other antennas. That is, a sum signal is provided for each respective pair of antennas. Thus, the multiplexer 23 provides an output signal, in the illustrated embodiment, corresponding to the sum of the output signal of antenna 12 and the respective output signal of each of the other antennas 13–15, 17 and 19, an output signal corresponding to the respective sum of the output signal of antenna 13 and a respective one of the output signals of the other antennas 14, 15, 17 and 19, etc. Preferably, the multiplexer 23, like the multiplexer 21 of FIG. 6, causes its output signal to additionally include the inverse of the output signal of at least each antenna other than one of the antennas that serves as a reference phase (e.g., the output signal of the antenna 12), as well as the respective sum of the output signal of each antenna and the inverse of the respective output signal of each other antenna. Thus, the output signal of the multiplexer 23 would include the output signal of each antenna 12–15, 17, 19, the inverse of the output signal of each antenna 12–15, 17, 19, the respective sums of the output signals of each pair of antennas 12–15, 17 and 19, and the respective sums of the output signal of each antenna and the inverse output signal of other of antennas 12–15, 17 and 19. This last set of signals can also be described as the difference between the respective output signals from antennas 12–15, 17 and 19.

Figure 10:
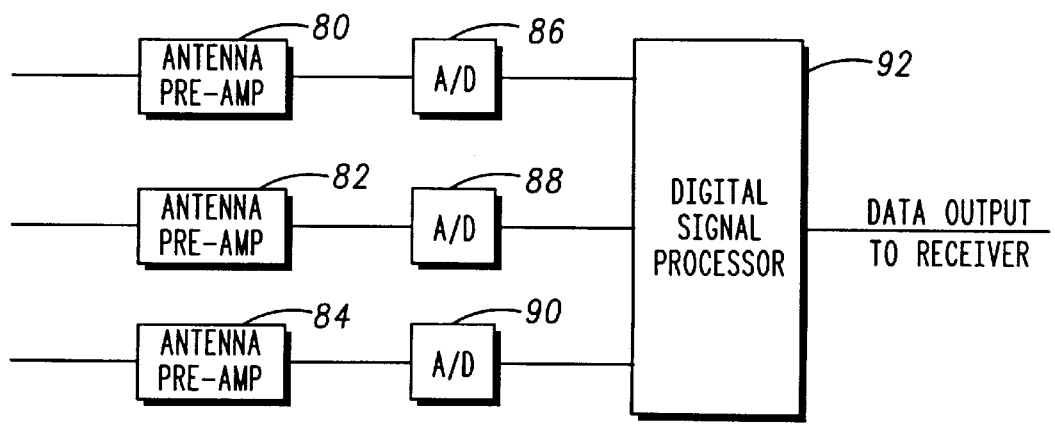
FIG. 10 illustrates a schematic showing a digital embodiment of the antenna array according to the invention.

In each of the above-identified embodiments, the processing of the signal fed to the receiver 24 has been carried out using analog signals. It is to be understood, however, that it is also possible to provide an array according to the present invention that processes the signals in a digital manner. Such an arrangement is shown in FIG. 10. As shown, the individual analog output signals from the individual antennas disposed about the periphery of the detection volume, after suitable processing in preamplifier circuits 80, 82 and 84 (for a three antenna arrangement) are fed to respective A/D converter circuits 86, 88, 90. The A/D output signals are fed to a digital signal processor (DSP) 92, which provides a data output signal for a digital receiver and decoder. In the DSP 92, the required inversion, summing and multiplexing to provide signals corresponding to those provided in the analog versions discussed above are carried out by means of software control in a conventional manner. That is, the DSP 92 cyclically provides a digital output signal including at least the respective instantaneous output signal values of each antenna, and the sum of the instantaneous signal values of each respective pair of input signals from the respective antennas. Preferably, the DSP 92 additionally includes, in its output signal, the inverse of the instantaneous output signal value of each antenna, and the respective sums of the output signal value of each antenna and the inverse of the respective output signal of each respective other antenna.

It is to be understood that although the invention has been described to this point utilizing antennas in the form of coils for detecting a modulated magnetic field produced by the tag as it passes through the detection volume, the invention is equally applicable to the detection of tags that produce a modulated electric or electrostatic field rather than a magnetic field. In such a case, instead of the antennas being coils, they may be realized, for example, in the form of simple wires or plates. Such a tag and detection scheme is described, for example, in commonly assigned U.S. Pat. No. 4,818,855, and in co-pending U.S. application Ser. No. 08/540,813, filed Oct. 11, 1995, the subject matter of which are incorporated herein by reference.

What is claimed is:

1. An antenna array for detecting a coded radio frequency identification tag signal generated by a tag during passage of the tag through a detection volume, the antenna array comprising:

first and second antennas disposed at different positions around a periphery of the detection volume; and, circuit means, having inputs connected to receive respective output signals from the first and second antennas, for providing an output signal that includes respective output signals of said first and second antennas and a sum of the output signals of said first and second antennas.

2. The antenna array defined in claim 1, wherein the output signal of said circuit means additionally includes an inverse of the output signal of the second antenna, and a sum of the output signal of the first antenna and the inverse of the output signal of the second antenna.

3. The antenna array defined in claim 1, wherein said detection volume is rectangular in cross section and said first and second antennas are disposed on adjacent sides of the rectangular cross section.

4. The antenna array defined in claim 1, wherein said detection volume is rectangular in cross-section and said first and second antennas are disposed on opposite sides of the detection volume.

5. The antenna array defined in claim 4, wherein said first and second antennas are planar coils that are positioned substantially parallel to each other.

6. The antenna array defined in claim 5, wherein said first and second antenna coils are positioned substantially perpendicular to a plane defined by the rectangular cross section of the detection volume.

7. The antenna array defined in claim 1, wherein said circuit means comprises:

a time division multiplexer having first and second inputs connected, respectively, to the first and second antennas, and an output connected to a signal receiver; and a control circuit for providing control signals to the multiplexer to thereafter cause the time division multiplexer to provide a multiplexer output signal including the respective output signals of said first and second antennas and the sum of the output signals of said first and second antennas.

8. The antenna array defined in claim 7, wherein said control signals cause the time division multiplexer to cyclically, sequentially provide:

a) the output signal from the first antenna;

b) the sum of the output signals from the first and second antennas; and c) the output signal of the second antenna.

9. The antenna array defined in claim 7, wherein: the multiplexer includes a circuit arrangement for providing a signal that is the inverse of the output signal of the second antenna, the control circuit producing a further control signal for the multiplexer to cause the multiplexer to additionally cyclically provide the inverse of the output signal of the second antenna, and the sum of the output signal of the first antenna and the inverse of the output signal of the second antenna.

10. The antenna array defined in claim 9, wherein said control signals cause the multiplexer to cyclically, sequentially provide:

a) the output signal of the first antenna;

b) the sum of the output signals from the first and second antennas;

c) the output signal from the second antenna;

d) the output signal of the first antenna;

e) the sum of the output signals of the first antenna and the inverse of the output signal of the second antenna; and f) the inverse of the output signal of the second antenna.

11. The antenna array defined in claim 7, wherein the time division multiplexer includes first and second switches each having a respective signal input connected to a respective one of said first and second antennas and a respective output connected to said multiplexer output, wherein said control signals include first and second control signals provided at respective outputs of the control circuit, and wherein said first and second control signals are used to enable said first and second switches, respectively.

12. The antenna array defined in claim 11, wherein the output of said second switch is connected to said multiplexer output via a further circuit that selectively supplies either one of the output signal of the second antenna and the inverse of the output signal of the second antenna to the multiplexer output, wherein said control circuit provides a third control signal for controlling said further circuit, so that one selected from the group of:

the output signal of the first antenna;

the output signal of the second antenna;

the sum of the output signals of the first and second antennas;

the inverse of the output signal of the second antenna; and the sum of the output signal of the first antenna and the inverse of the output signal of the second antenna is cyclically provided at the multiplexer output.

13. The antenna array defined in claim 12, wherein said further circuit of said multiplexer includes third and fourth switches each having a signal input and a control input, the signal input of said third switch being directly connected to said output of said second switch, the signal input of said fourth switch being connected to said output of said second switch via a signal inverter circuit, the control input of said third switch being connected to receive the third control signal from said control circuit via an inverter, and the control input of said fourth switch being connected to receive the third control signal directly from said control circuit.

14. The antenna array defined in claim 1, wherein said first and second antennas include antenna coils, and said circuit means comprises a switching circuit arrangement connected to said first and second antenna coils, for cyclically, selectively connecting, to the output of the circuit means, one of the first antenna coil, the second antenna coil, and a combination of the first and second antenna coils connected in series-aiding.

15. The antenna array defined in claim 14, wherein said switching circuit arrangement additionally selectively connects, to the output of the circuit means, the first and second antenna coils connected in series-opposing.

16. The antenna array defined in claim 1, wherein said circuit means comprises:

a respective analog to digital converter connected to each of said antennas; and a digital signal processor, connected to an output of each of said analog to digital converters, for cyclically providing, to a signal receiver, a digital output signal including the respective output signals of said first and second antennas and the sum of the output signals of said first and second antennas.

17. The antenna array defined in claim 16, wherein the digital signal processor additionally provides an inverse of the output signal of the second antenna, and a sum of the output signal of the first antenna and the inverse of the output signal of the second antenna.

18. The antenna array defined in claim 1, wherein a plurality of antennas are disposed at different positions around the periphery of the detection volume; and said circuit means receives respective output signals from each of the antennas and provides an output signal that provides, to a signal receiver, the respective output signals of each of the plurality of antennas and signals corresponding to a sum of the respective output signals of each of the plurality of antennas and the output signals of each other antenna.

19. The antenna array defined in claim 18, wherein the output signal of said circuit means additionally includes an inverse of the output signal of at least each of the plurality of antennas other than said first antenna, and a sum of the output signal of each antenna and the inverse of the output signal of each other antenna.

20. A method of detecting a radio frequency identification (RFID) tag signal generated by a tag, the method comprising the steps of:

providing a detection volume through which the tag is to be passed;

positioning a plurality of antennas around a periphery of the detection volume;

receiving output signals from the plurality of antennas;

summing at least one pair of output signals from the plurality of antennas; and providing a multiplexed output that includes at least one antenna output signal and at least one antenna pair summed signal to a signal receiver for detecting the RFID tag signal.

21. The method of claim 20, further comprising the step of inverting at least one output signal from the plurality of antennas.

22. The method of claim 21, further comprising the steps of:

summing at least one antenna output signal with the inverted output signal to produce a difference output signal; and providing the difference output signal to the signal receiver.

* * * * *